(12) United States Patent (10) Patent No.: US 8,945,736 B2
Uensal et al. (45) Date of Patent: Feb. 3, 2015

(54) METHOD FOR CONDITIONING MEMBRANE-ELECTRODE-UNITS FOR FUEL CELLS

(71) Applicant: BASF Fuel Cell GmbH, Frankfurt am Main (DE)

(72) Inventors: Oemer Uensal, Mainz (DE); Joachim Kiefer, Losheim am See (DE); Isabel Kundler, Königstein (DE); Mathias Weber, Rüsselsheim (DE); Christoph Padberg, Wiesbaden (DE); Thomas Schmidt, Frankfurt (DE); Jochen Baurmeister, Eppstein (DE); Gordon Calundann, North Plainfield, NJ (US); Glen Hoppes, Bochum (DE)

(73) Assignee: BASF Fuel Cell GmbH (DE)

( * ) Notice: Subject to any disclaimer, the term of this patent is extended or adjusted under 35 U.S.C. 154(b) by 0 days.

(21) Appl. No.: 13/659,414

(22) Filed: Oct. 24, 2012

(65) Prior Publication Data

US 2013/0095409 A1 Apr. 18, 2013

Related U.S. Application Data

(63) Continuation of application No. 12/065,786, filed as application No. PCT/EP2006/008759 on Sep. 8, 2006.

(30) Foreign Application Priority Data

Sep. 10, 2005 (DE) .......................... 10 2005 043 127

(51) Int. Cl.
*H01M 8/04* (2006.01)

(52) U.S. Cl.
USPC ................ 429/24; 429/13; 429/483; 429/535

(58) Field of Classification Search
USPC ....................... 429/24, 13, 483, 535
See application file for complete search history.

(56) References Cited

U.S. PATENT DOCUMENTS

| 6,962,760 | B2 * | 11/2005 | Rice et al. ..................... 429/431 |
| 7,332,530 | B2 | 2/2008 | Kiefer et al. |
| 7,682,722 | B2 * | 3/2010 | Melzner et al. ............... 429/480 |
| 2004/0262227 | A1 | 12/2004 | Kiefer et al. |
| 2005/0053820 | A1 | 3/2005 | Calundann et al. |
| 2005/0074654 | A1 | 4/2005 | Kiefer et al. |
| 2005/0084727 | A1 * | 4/2005 | Kiefer et al. ..................... 429/33 |
| 2005/0118477 | A1 * | 6/2005 | Kiefer et al. ..................... 429/33 |
| 2005/0118478 | A1 | 6/2005 | Kiefer et al. |
| 2005/0147859 | A1 | 7/2005 | Kiefer et al. |
| 2005/0175879 | A1 | 8/2005 | Kiefer et al. |
| 2005/0181254 | A1 | 8/2005 | Uensal et al. |
| 2005/0202293 | A1 * | 9/2005 | Kagami et al. ................. 429/24 |
| 2005/0256296 | A1 | 11/2005 | Kiefer et al. |

(Continued)

FOREIGN PATENT DOCUMENTS

| WO | WO-01/18894 A2 | 3/2001 |
| WO | WO-2005/063852 A1 | 7/2005 |
| WO | WO-2006/008075 A1 | 1/2006 |

*Primary Examiner* — Peter D. Mulcahy
*Assistant Examiner* — Henry Hu
(74) *Attorney, Agent, or Firm* — Drinker Biddle & Reath LLP

(57) ABSTRACT

The present invention relates to a method for the conditioning of membrane electrode assemblies for fuel cells in which the output of the membrane electrode assemblies used can be increased and therefore the efficiency of the resulting polymer electrolyte membrane fuel cells can be improved.

19 Claims, 1 Drawing Sheet

(56) References Cited

U.S. PATENT DOCUMENTS

| | | |
|---|---|---|
| 2006/0008690 A1 | 1/2006 | Uensal et al. |
| 2006/0166067 A1 | 7/2006 | Kiefer et al. |
| 2006/0183012 A1 | 8/2006 | Uensal et al. |
| 2006/0210881 A1 | 9/2006 | Calundann et al. |
| 2006/0234099 A1 | 10/2006 | Muellen |
| 2007/0102361 A1 | 5/2007 | Kiefer et al. |
| 2007/0141426 A1* | 6/2007 | Choi et al. ............ 429/33 |
| 2007/0178232 A1* | 8/2007 | Kodas et al. ............ 427/180 |
| 2007/0292734 A1 | 12/2007 | Kiefer et al. |
| 2008/0026277 A1 | 1/2008 | Peterson et al. |
| 2008/0038624 A1 | 2/2008 | Belack et al. |
| 2008/0075842 A1* | 3/2008 | Brewster et al. ............ 427/115 |
| 2008/0233271 A1* | 9/2008 | Haring ............ 427/58 |
| 2012/0070765 A1* | 3/2012 | Choi et al. ............ 429/483 |

* cited by examiner

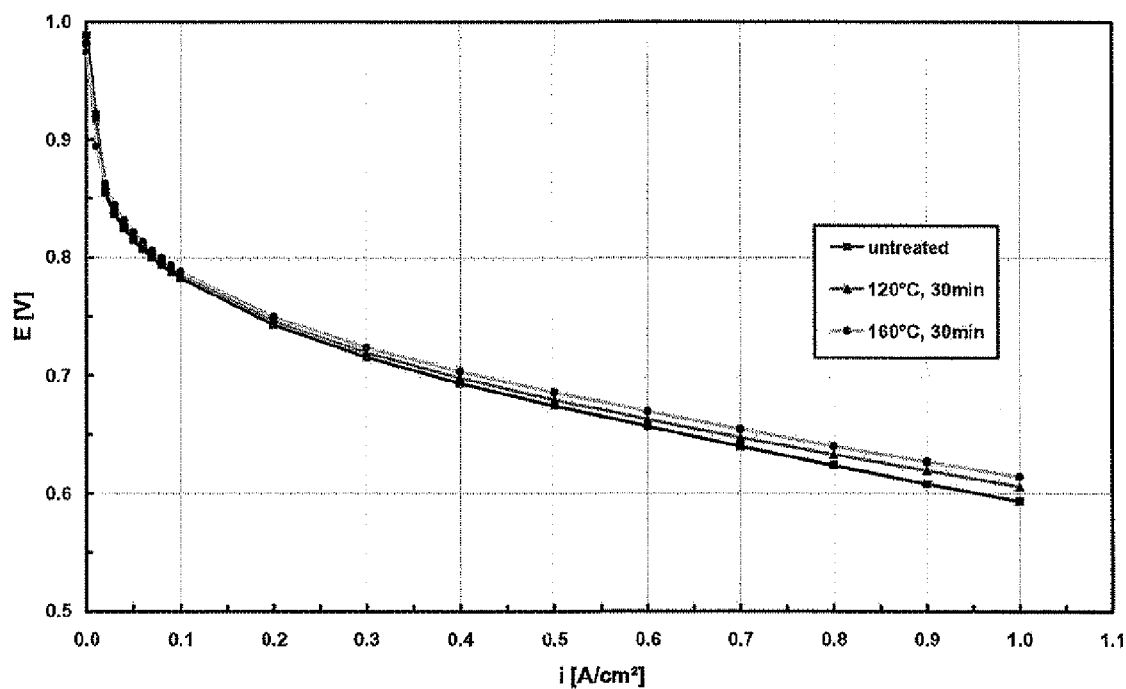

METHOD FOR CONDITIONING MEMBRANE-ELECTRODE-UNITS FOR FUEL CELLS

RELATED APPLICATIONS

This application is a continuation application of U.S. patent application Ser. No. 12/065,786, filed Mar. 6, 2012, which is a national stage application (under 35 U.S.C. 371) of PCT/EP2006/008759 filed Sep. 8, 2006, which claims benefit of German Application No. 10 2005 043 127.5 filed Sep. 10, 2005.

The present invention relates to a method for the conditioning of membrane electrode assemblies for fuel cells in which the output of the membrane electrode assemblies used can be increased and therefore the efficiency of the resulting polymer electrolyte membrane fuel cells can be improved.

A fuel cell usually contains an electrolyte and two electrodes separated by the electrolyte, in which one of the two electrodes is supplied with a fuel, such as hydrogen gas or a mixture of methanol and water, and the other electrode is supplied with an oxidant, such as oxygen gas or air. In the process, chemical energy arising from the resulting fuel oxidation is directly converted into electric power.

One requirement of the electrolyte is that it is permeable to hydrogen ions, i.e. protons, but not to the fuels mentioned above.

Typically, a fuel cell comprises several individual cells, so-called MEAs (membrane electrode assembly), each of which contains an electrolyte and two electrodes separated by the electrolyte.

As electrolyte for the fuel cell, solids, such as polymer electrolyte membranes, or liquids, such as phosphoric acid, are applied. Polymer electrolyte membranes have recently attracted interest as electrolytes for fuel cells.

Polymer electrolyte membranes with complexes of alkaline polymers and strong acids are known from WO96/13872, for example. To produce these, an alkaline polymer, for example polybenzimidazole, is treated with a strong acid, such as phosphoric acid.

Furthermore, fuel cells in which their membrane comprises inorganic support materials, such as for example glass-fibre fabrics or glass-fibre veils, which are saturated with phosphoric acid, are also known (see U.S. Pat. No. 4,017,664).

In the alkaline polymer membranes known in the prior art, the mineral acid (mostly concentrated phosphoric acid) used—to achieve the required proton conductivity—is usually added following the forming of the polyazole film. In doing so, the polymer serves as a support for the electrolyte consisting of the highly concentrated phosphoric acid. In the process, the polymer membrane fulfils further essential functions, particularly, it has to exhibit a high mechanical stability and serve as a separator for the two fuels mentioned at the outset.

An essential advantage of such a membrane doped with phosphoric acid is the fact that a fuel cell in which such a polymer electrolyte membrane is used can be operated at temperatures above 100° C. without the humidification of the fuels otherwise necessary. This is due to the characteristic of the phosphoric acid to be able to transport the protons without additional water via the so-called Grotthus mechanism (K.-D. Kreuer, Chem. Mater. 1996, 8, 610-641).

Further advantages for the fuel cell system are achieved through the possibility of operation at temperatures above 100° C. On the one hand, the sensitivity of the Pt catalyst to gas impurities, in particular CO, is reduced substantially. CO is formed as a by-product in the reforming of hydrogen-rich gas from carbon-containing compounds, such as, e.g., natural gas, methanol or benzine, or also as an intermediate product in the direct oxidation of methanol. Typically, the CO content of the fuel has to be lower than 100 ppm at temperatures <100° C. However, at temperatures in the range of 150-200', 10,000 ppm CO or more can also be tolerated (N. J. Bjerrum et. al., Journal of Applied Electrochemistry, 2001, 31, 773-779). This results in substantial simplifications of the upstream reforming process and therefore reductions of the cost of the entire fuel cell system.

The output of a membrane electrode assembly produced with such membranes is described in WO 01/18894 and in Electrochimica Acta, Volume 41, 1996, 193-197 and amounts to less than 0.2 A/cm$^2$ with a platinum loading of 0.5 mg/cm$^2$ (anode) and 2 mg/cm$^2$ (cathode) and a voltage of 0.6 V. When using air instead of oxygen, this value drops to less than 0.1 A/cm$^2$.

A big advantage of fuel cells is the fact that, in the electrochemical reaction, the energy of the fuel is directly converted into electric power and heat. In the process, water is formed at the cathode as a reaction product. Heat is also produced in the electrochemical reaction as a by-product. In applications in which only the power for the operation of electric motors is utilised, such as e.g. in automotive applications, or as a versatile replacement of battery systems, part of the heat generated in the reaction has to be dissipated to prevent overheating of the system. Additional energy-consuming devices which further reduce the total electric efficiency of the fuel cell are then needed for cooling. In stationary applications, such as for the centralised or decentralised generation of electricity and heat, the heat can be used efficiently by existing technologies, such as, e.g., heat exchangers. In doing so, high temperatures are aimed for to increase the efficiency. If the operating temperature is higher than 100° C. and the temperature difference between the ambient temperature and the operating temperature is high, it will be possible to cool the fuel cell system more efficiently, for example using smaller cooling surfaces and dispensing with additional devices, in comparison to fuel cells which have to be operated at less than 100° C. due to the humidification of the membrane.

The membrane electrode assemblies set forth above already show a good property profile, however, the capability, for example the current density at high voltages, of known membrane electrode assemblies has to be improved further.

A further object was to provide a membrane electrode assembly which exhibits a high capability, in particular a high current density or a high current density at a high voltage, respectively, over a wide range of temperatures.

Additionally, the membrane electrode assembly according to the invention has to display high durability, in particular a long service life at the high power densities demanded.

An ongoing object in all membrane electrode assemblies is to lower the quantities of catalysts to minimise the production costs without thereby reducing the capability significantly. Advantageously, it should be possible to operate the membrane electrode assembly with little gas flow and/or with low excess pressure achieving high power density.

Therefore, the present invention has the object to provide membrane electrode assemblies which, on the one hand, meet the criteria set forth above and, on the other hand, show an improved output.

The subject-matter of the present invention is a method for conditioning a membrane electrode assembly wherein a membrane electrode assembly containing A) at least one polymer electrolyte matrix containing at least one oxo acid of phosphorus and/or sulphur and at least one polymer with at least one heteroatom selected from the group of nitrogen, oxygen and/or sulphur,
B) at least two electrodes,
is conditioned after the lamination of the polymer electrolyte matrix and the electrodes in a temperature range of 60° C. to 300° C.

The membrane electrode assembly resulting from the method according to the invention shows an improved output in comparison with membrane electrode assemblies, which have not been conditioned with the method according to the invention.

The conditioning according to the invention is performed at temperatures from 60° C. to 300° C., preferably from 80° C. to 300° C., in particular from 100° C. to 290° C., particularly preferably from 110° C. to 280° C., very particularly preferably from 140° C. to 275° C.

The minimum duration of the conditioning according to the invention is at least 30 seconds, preferably at least 1 minute, in particular at least 2 minutes.

The duration of the conditioning is at most 24 hours. It is possible to also operate the conditioning for longer than 24 hours; however, no significant improvement of the performance is observed in the process.

A treatment time of 30 seconds to 24 hours, preferably 1 minute to 20 hours, in particular 2 minutes to 20 hours, is considered to be an economically sensible treatment time.

By means of the conditioning described above, the water content of the polymer electrolyte matrix in the membrane electrode assembly of about 26% by weight is significantly reduced. It has been shown that the improvement of the performance starts when the water content is decreased to 20% by weight and less. After conditioning, the water content of the polymer electrolyte matrix in the membrane electrode assembly is therefore less than 20% by weight.

Inasmuch as the conditioning according to the invention of the membrane electrode assembly is performed in the installed cell, it is advantageous to flush the cell and therefore also the membrane electrode assembly with at least one gaseous medium. In this manner, water possibly present is discharged and the residual water content described above is obtained.

In a conditioning in the cell, this is substantially performed under currentless conditions, i.e. at most a current which corresponds to 10 mA/cm² at 800 mV is drawn during the conditioning. Thus, the conditioning can also be performed within the scope of a controlled start of the cell.

As gaseous media, all gaseous media, preferably air, oxygen, nitrogen and/or noble gases, such as argon, helium, are suitable. Preferably, gaseous media which contain no hydrogen gas or develop no hydrogen gas under the chosen conditions and therefore undergo electrochemical reactions are used.

Inasmuch as the conditioning according to the invention of the membrane electrode assembly is performed in a state in which it is not installed, the flushing process with a gaseous medium can also be dispensed with.

The membrane electrode assemblies conditioned according to the invention contain at least one polymer electrolyte matrix, which in turn contains at least one polymer with at least one heteroatom selected from the group of nitrogen, oxygen and/or sulphur. The polymers are preferably alkaline polymers.

The alkaline polymers are preferably polymers, which comprise at least one nitrogen atom.

The alkalinity of the polymer can also be defined via the molar ratio of nitrogen atoms to carbon atoms. The scope of the present invention encompasses in particular such polymers whose molar ratio of nitrogen atoms to carbon atoms is in the range of 1:1 to 1:100, preferably in the range of 1:2 to 1:20. This ratio can be determined by elemental analysis.

Alkaline polymers, in particular polymers with at least one nitrogen atom, are known in professional circles. In general, polymers with one nitrogen atom in the backbone and/or in the side chain can be used.

The polymers with one nitrogen atom include, for example, polyphosphazenes, polyimines, polyisocyanides, polyetherimine, polyaniline, polyamides, polyhydrazides, polyurethanes, polyimides, polyazoles and/or polyazines.

Preferably, the polymer membranes comprise polymers with at least one nitrogen atom used in a repeating unit. In this connection, it is also possible to use copolymers which, in addition to repeating units with one nitrogen atom, also comprise repeating units without a nitrogen atom.

According to a particular aspect of the present invention, alkaline polymers with at least one nitrogen atom are used. The term alkaline is known in professional circles in which this is to be understood in particular as Lewis and Brønstedt alkalinity.

The repeating unit in the alkaline polymer preferably contains an aromatic ring with at least one nitrogen atom. The aromatic ring is preferably a five- to six-membered ring with one to three nitrogen atoms which can be fused to another ring, in particular another aromatic ring.

Polymers based on polyazole generally contain recurring azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVII) and/or (XVIII) and/or (XIX) and/or (XX) and/or (XXI) and/or (XXII).

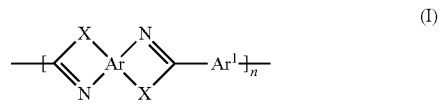

(I)

(II)

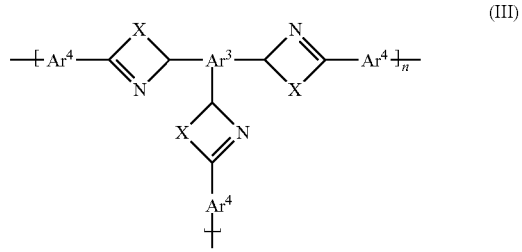

(III)

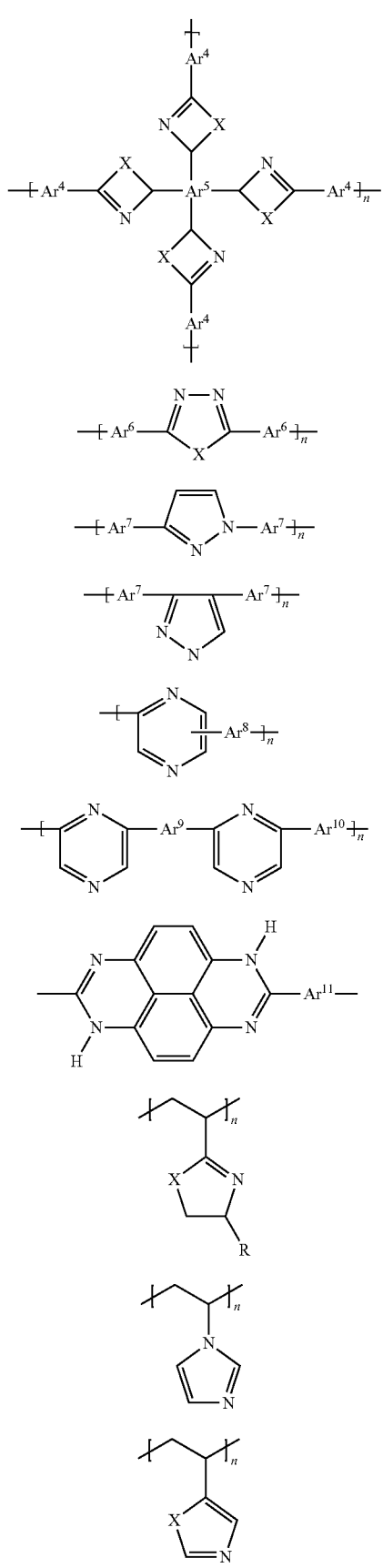
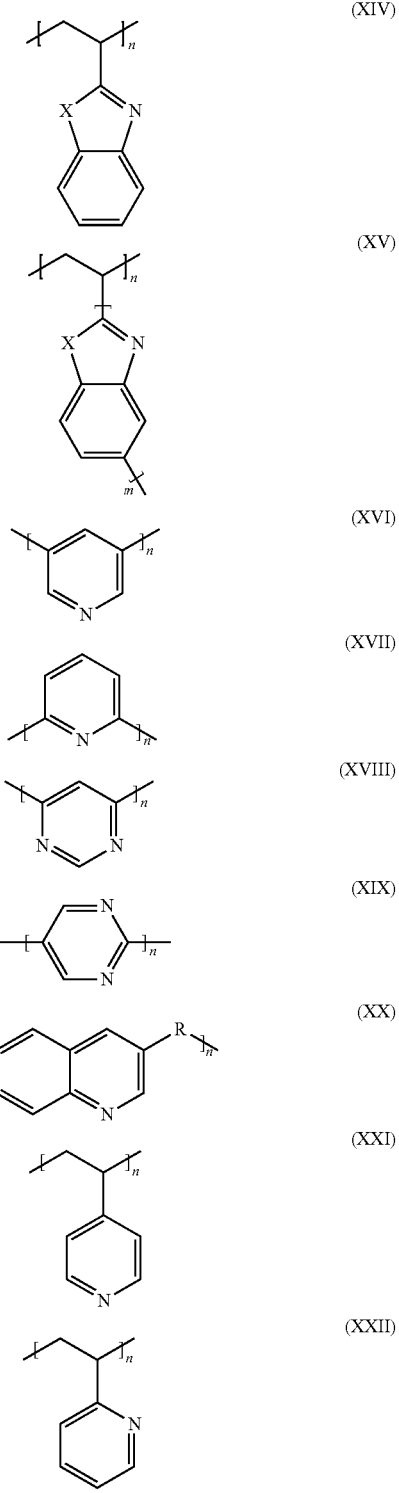
wherein
Ar are the same or different and are each a tetravalent aromatic or heteroaromatic group which may be mononuclear or polynuclear,
$Ar^1$ are the same or different and are each a divalent aromatic or heteroaromatic group which may be mononuclear or polynuclear, Ar² are the same or different and are each a divalent or trivalent aromatic or heteroaromatic group which may be mononuclear or polynuclear,
Ar³ are the same or different and are each a trivalent aromatic or heteroaromatic group which may be mononuclear or polynuclear,
Ar⁴ are the same or different and are each a trivalent aromatic or heteroaromatic group which may be mononuclear or polynuclear,
Ar⁵ are the same or different and are each a tetravalent aromatic or heteroaromatic group which may be mononuclear or polynuclear,
Ar⁶ are the same or different and are each a divalent aromatic or heteroaromatic group which may be mononuclear or polynuclear,
Ar⁷ are the same or different and are each a divalent aromatic or heteroaromatic group which may be mononuclear or polynuclear,
Ar⁸ are the same or different and are each a trivalent aromatic or heteroaromatic group which may be mononuclear or polynuclear,
Ar⁹ are the same or different and are each a divalent or trivalent or tetravalent aromatic or heteroaromatic group which may be mononuclear or polynuclear,
Ar¹⁰ are the same or different and are each a divalent or trivalent aromatic or heteroaromatic group which may be mononuclear or polynuclear,
Ar¹¹ are the same or different and are each a divalent aromatic or heteroaromatic group which may be mononuclear or polynuclear,
X are the same or different and are each oxygen, sulphur or an amino group which bears a hydrogen atom, a group having 1-20 carbon atoms, preferably a branched or unbranched alkyl or alkoxy group, or an aryl group as further radical,
R are identical or different and represent hydrogen, an alkyl group and an aromatic group, with the proviso that R in the formula (XX) is not hydrogen, and
n, m are each an integer greater than or equal to 10, preferably greater or equal to 100.

Aromatic or heteroaromatic groups which are preferred according to the invention are derived from benzene, naphthalene, biphenyl, diphenyl ether, diphenylmethane, diphenyldimethylmethane, bisphenone, diphenylsulphone, thiophene, furan, pyrrole, thiazole, oxazole, imidazole, isothiazole, isoxazole, pyrazole, 1,3,4-oxadiazole, 2,5-diphenyl-1,3,4-oxadiazole, 1,3,4-thiadiazole, 1,3,4-triazole, 2,5-diphenyl-1,3,4-triazole, 1,2,5-triphenyl-1,3,4-triazole, 1,2,4-oxadiazole, 1,2,4-thiadiazole, 1,2,4-triazole, 1,2,3-triazole, 1,2,3,4-tetrazole, benzo[b]thiophene, benzo[b]furan, indole, benzo[c]thiophene, benzo[c]furan, isoindole, benzoxazole, benzothiazole, benzimidazole, benzisoxazole, benzisothiazole, benzopyrazole, benzothiadiazole, benzotriazole, dibenzofuran, dibenzothiophene, carbazole, pyridine, bipyridine, pyrazine, pyrazole, pyrimidine, pyridazine, 1,3,5-triazine, 1,2,4-triazine, 1,2,4,5-triazine, tetrazine, quinoline, isoquinoline, quinoxaline, quinazoline, cinnoline, 1,8-naphthyridine, 1,5-naphthyridine, 1,6-naphthyridine, 1,7-naphthyridine, phthalazine, pyridopyrimidine, purine, pteridine or quinolizine, 4H-quinolizine, diphenyl ether, anthracene, benzopyrrole, benzooxathiadiazole, benzooxadiazole, benzopyridine, benzopyrazine, benzopyrazidine, benzopyrimidine, benzotriazine, indolizine, pyridopyridine, imidazopyrimidine, pyrazinopyrimidine, carbazole, acridine, phenazine, benzoquinoline, phenoxazine, phenothiazine, acridizine, benzopteridine, phenanthroline and phenanthrene, each of which may optionally also be substituted.

In this case, Ar¹, Ar⁴, Ar⁶, Ar⁷, Ar⁸, Ar⁹, Ar¹⁰, Ar¹¹ can have any substitution pattern, in the case of phenylene, for example, Ar¹, Ar⁴, Ar⁶, Ar⁷, Ar⁸, Ar⁹, Ar¹⁰, Ar¹¹ can be ortho-, meta- and para-phenylene. Particularly preferred groups are derived from benzene and biphenylene, which may also be substituted.

Preferred alkyl groups are short-chain alkyl groups having 1 to 4 carbon atoms, e.g. methyl, ethyl, n- or i-propyl and t-butyl groups.

Preferred aromatic groups are phenyl or naphthyl groups. The alkyl groups and the aromatic groups can be substituted.

Preferred substituents are halogen atoms such as, e.g., fluorine, amino groups, hydroxyl groups or short-chain alkyl groups such as, e.g., methyl or ethyl groups.

Polyazoles having recurring units of the formula (I) are preferred wherein the radicals X within one recurring unit are identical.

The polyazoles can in principle also have different recurring units wherein their radicals X are different, for example. It is preferable, however, that a recurring unit has only identical radicals X.

Further preferred polyazole polymers are polyimidazoles, polybenzothiazoles, polybenzoxazoles, polyoxadiazoles, polyquinoxalines, polythiadiazoles, poly(pyridines), poly(pyrimidines) and poly(tetrazapyrenes).

In another embodiment of the present invention, the polymer containing recurring azole units is a copolymer or a blend which contains at least two units of the formulae (I) to (XXII) which differ from one another. The polymers can be in the form of block copolymers (diblock, triblock), random copolymers, periodic copolymers and/or alternating polymers.

In a particularly preferred embodiment of the present invention, the polymer containing recurring azole units is a polyazole which only contains units of the formulae (I) and/or (II).

The number of recurring azole units in the polymer is preferably an integer greater than or equal to 10. Particularly preferred polymers contain at least 100 recurring azole units.

Within the scope of the present invention, polymers containing recurring benzimidazole units are preferred. Some examples of the most purposeful polymers containing recurring benzimidazole units are represented by the following formulae:

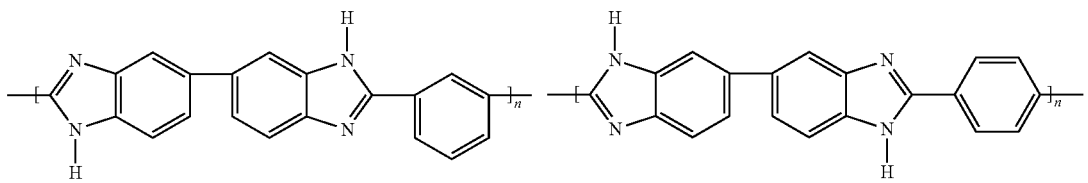

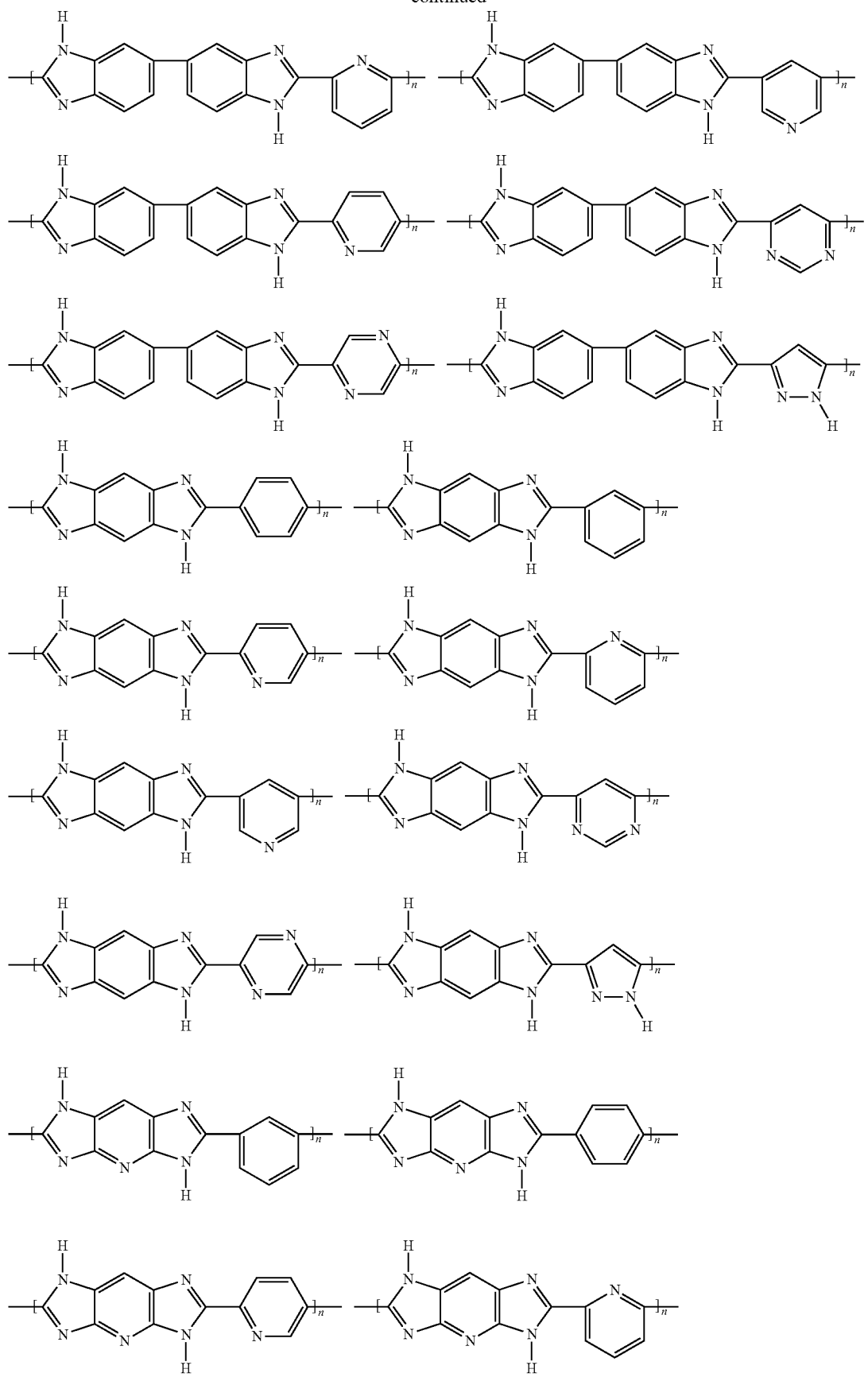

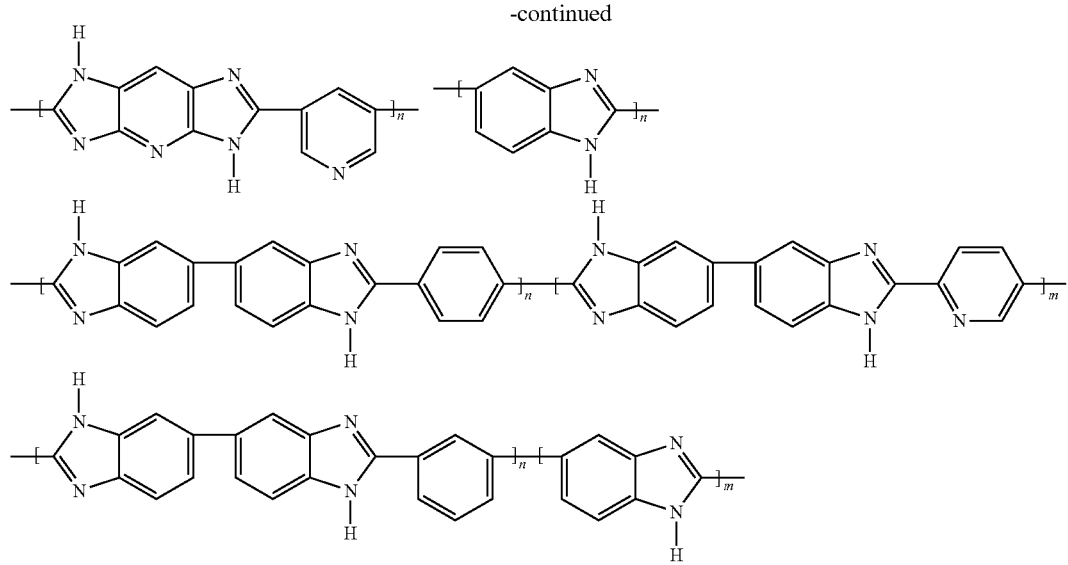

where n and m are each an integer greater than or equal to 10, preferably greater than or equal to 100.

Further preferred polyazole polymers are polyimidazoles, polybenzimidazole ether ketone, polybenzothiazoles, polybenzoxazoles, polytriazoles, polyoxadiazoles, polythiadiazoles, polypyrazoles, polyquinoxalines, poly(pyridines), poly(pyrimidines) and poly(tetrazapyrenes).

Preferred polyazoles are characterized by a high molecular weight. This applies in particular to the polybenzimidazoles. Measured as the intrinsic viscosity, this is in the range of 0.3 to 10 dl/g, preferably 1 to 5 dl/g.

Celazole from the company Celanese is particularly preferred. The properties of the polymer film and polymer membrane can be improved by screening the starting polymer, as described in German patent application No. 10129458 A1.

Very particular preference is given to using para-polybenzimidazoles in the production of the polymer electrolyte membranes. In this connection, the polybenzimidazoles comprise in particular six-membered aromatic groups which are linked at the 1,4 position. Particular preference is given to using poly-[2,2'-(p-phenylene)-5,5'-bisbenzimidazole].

The polymer film used for the doping and based on alkaline polymers can comprise still more additives in the form of fillers and/or auxiliaries. Additionally, the polymer film can feature further modifications, for example by cross-linking, as described in the German patent application DE 10110752 A1 or in WO 00/44816. In a preferred embodiment, the polymer film used for the doping and consisting of an alkaline polymer and at least one blend component additionally contains a cross-linking agent, as described in the German patent application DE 10140147 A1. An essential advantage of such a system is the fact that higher doping levels and therefore a greater conductivity with sufficient mechanical stability of the membrane can be achieved.

In addition to the above-mentioned alkaline polymers, a blend of one or more alkaline polymers with another polymer can be used. In this case, the function of the further blend component is essentially to improve the mechanical properties and reduce the cost of material.

Preferred blend components include polysulphones, in particular polysulphone having aromatic and/or heteroaromatic groups in the backbone. According to a particular aspect of the present invention, preferred polysulphones and polyethersulphones have a melt volume rate MVR 300/21.6 of less than or equal to 40 cm$^3$/10 min, in particular less than or equal to 30 cm$^3$/10 min and particularly preferably less than or equal to 20 cm$^3$/10 min, measured in accordance with ISO 1133. In this connection, polysulphones with a Vicat softening point VST/A/50 of 180° C. to 230° C. are preferred. In yet another preferred embodiment of the present invention, the number average of the molecular weight of the polysulphones is greater than 30,000 g/mol.

The polymers based on polysulphone include in particular polymers having recurring units with linking sulphone groups according to the general formulae A, B, C, D, E, F and/or G:

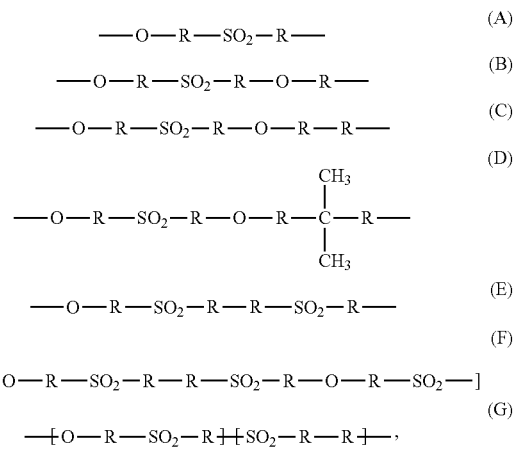

wherein the radicals R, independently of another, identical or different, represent aromatic or heteroaromatic groups, these radicals having been explained in detail above. These include in particular 1,2-phenylene, 1,3-phenylene, 1,4-phenylene, 4,4'-biphenyl, pyridine, quinoline, naphthalene, phenanthrene.

The polysulphones preferred within the scope of the present invention include homopolymers and copolymers, for example random copolymers. Particularly preferred polysulphones comprise recurring units of the formulae H to N:

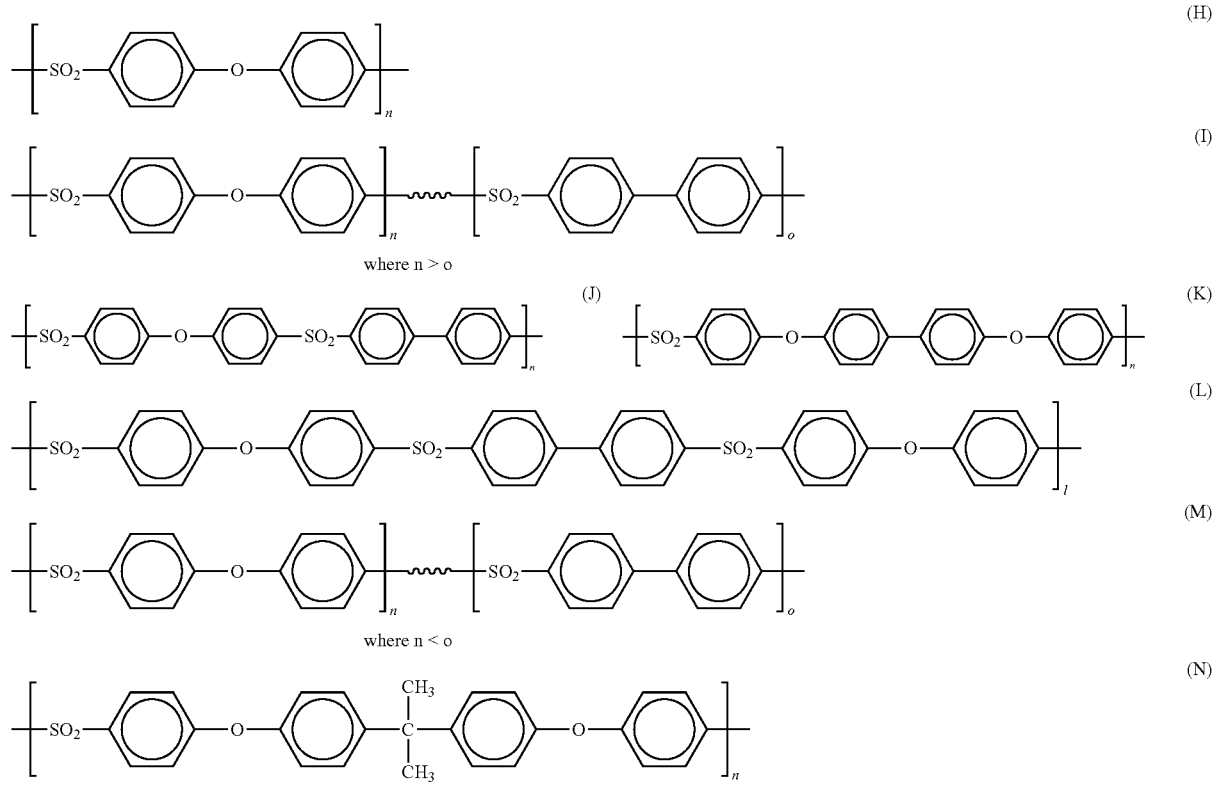

The previously described polysulphones can be obtained commercially under the trade names ®Victrex 200 P, ®Victrex 720 P, ®Ultrason E, ®Ultrason S, ®Mindel, ®Radel A, ®Radel R, ®Victrex HTA, ®Astrel and ®Udel.

Furthermore, polyether ketones, polyether ketone ketones, polyether ether ketones, polyether ether ketone ketones and polyaryl ketones are particularly preferred. These high-performance polymers are known per se and can be obtained commercially under the trade names Victrex® PEEK™, ®Hostatec, ®Kadel.

Furthermore, polymeric blend components which contain acid groups can be used. These acid groups comprise in particular sulphonic acid groups. Here, polymers containing aromatic sulphonic acid groups can be used with preference.

Aromatic sulphonic acid groups are groups in which the sulphonic acid group (—SO$_3$H) is covalently bonded to an aromatic or heteroaromatic group. The aromatic group can be part of the backbone of the polymer or part of a side group wherein polymers having aromatic groups in the backbone are preferred. In many cases, the sulphonic acid groups can also be used in the form of their salts. Furthermore, derivatives, for example esters, in particular methyl or ethyl esters, or halides of the sulphonic acids can be used which are converted to the sulphonic acid during operation of the membrane.

The polymers modified with sulphonic acid groups preferably have a content of sulphonic acid groups in the range from 0.5 to 3 meq/g. This value is determined by way of the so-called ion exchange capacity (IEC).

To measure the IEC, the sulphonic acid groups are converted to the free acid. To this end, the polymer is treated in a known way with acid, removing excess acid by washing. Thus, the sulphonated polymer is initially treated for 2 hours in boiling water. Subsequently, excess water is dabbed off and the sample is dried at 160° C. in a vacuum drying cabinet at p<1 mbar for 15 hours. Then, the dry weight of the membrane is determined. The polymer thus dried is then dissolved in DMSO at 80° C. for 1 h. Subsequently, the solution is titrated with 0.1M NaOH. The ion exchange capacity (IEC) is then calculated from the consumption of acid up to the equivalent point and the dry weight.

Such polymers are known by those in the field. Polymers containing sulphonic acid groups can be produced, for example, by sulphonation of polymers. Methods for the sulphonation of polymers are described in F. Kucera et al., Polymer Engineering and Science 1988, Vol. 38, No. 5, 783-792. In this connection, the sulphonation conditions can be chosen such that a low degree of sulphonation develops (DE-A-19959289).

A further class of non-fluorinated polymers has been developed by sulphonation of high-temperature-stable thermoplasts. For example, sulphonated polyether ketones (DE-A-4219077, WO96/01177), sulphonated polysulphones (J. Membr. Sci. 83 (1993) p. 211) or sulphonated polyphenylene sulphide (DE-A-19527435) are known.

U.S. Pat. No. 6,110,616 describes copolymers of butadiene and styrene and the subsequent sulphonation thereof for use for fuel cells.

Furthermore, such polymers can also be obtained by polyreactions of monomers, which comprise acid groups. Thus, perfluorinated polymers as described in U.S. Pat. No. 5,422,411 can be produced by copolymerisation of trifluorostyrene and sulphonyl-modified trifluorostyrene.

These perfluorosulphonic acid polymers include inter alia Nafion® (U.S. Pat. No. 3,692,569). This polymer can—as described in U.S. Pat. No. 4,453,991—be brought into solution and then used as an ionomer.

The preferred polymers containing acid groups include inter alia sulphonated polyether ketones, sulphonated polysulphones, sulphonated polyphenylene sulphides, perfluorinated sulphonic acid group-containing polymers, as described in U.S. Pat. No. 3,692,569, U.S. Pat. No. 5,422,411 and U.S. Pat. No. 6,110,616.

Besides the above-mentioned blend, polyolefines, such as poly(chloroprene), polyacetylene, polyphenylene, poly(p-xylylene), polyarylmethylene, polyarmethylene, polystyrene, polymethylstyrene, polyvinyl alcohol, polyvinyl acetate, polyvinyl ether, polyvinyl amine, poly(N-vinyl acetamide), polyvinyl imidazole, polyvinyl carbazole, polyvinyl pyrrolidone, polyvinyl pyridine, polyvinyl chloride, polyvinylidene chloride, polytetrafluoroethylene, polyhexafluoropropylene, copolymers of PTFE with hexafluoropropylene, with perfluoropropylvinyl ether, with trifluoronitrosomethane, with sulphonyl fluoride vinyl ether, with carbalkoxyperfluoroalkoxyvinyl ether, polychlorotrifluoroethylene, polyvinyl fluoride, polyvinylidene fluoride, polyacrolein, polyacrylamide, polyacrylonitrile, polycyanoacrylates, polymethacrylimide, cycloolefinic copolymers, in particular of norbornenes;
polymers having C—O bonds in the backbone, for example polyacetal, polyoxymethylene, polyether, polypropylene oxide, polyepichlorohydrin, polytetrahydrofuran, polyphenylene oxide, polyether ketone, polyester, in particular polyhydroxyacetic acid, polyethyleneterephthalate, polybutyleneterephthalate, polyhydroxybenzoate, polyhydroxypropionic acid, polypivalolacton, polycaprolacton, polymalonic acid, polycarbonate;
polymeric C—S bonds in the backbone, for example polysulphide ether, polyphenylenesulphide, polyethersulphone;
polymers containing C—N bonds in the backbone, for example
polyimines, polyisocyanides, polyetherimine, polyaniline, polyamides,
polyhydrazides, polyurethanes, polyimides, polyazoles, polyazines;
liquid crystalline polymers, in particular Vectra, as well as inorganic polymers, such as polysilanes, polycarbosilanes, polysiloxanes, polysilicic acid, polysilicates, silicons, polyphosphazenes and polythiazyl, can also be used.

By using blends, the mechanical properties can be improved and the material costs can be reduced.

Additionally—as already mentioned above—, the blend polymer film can also feature further modifications, for example by cross-linking, as described in the German patent application DE 10110752 A1 or in WO 00/44816. In a preferred embodiment, the polymer film used for the swelling and consisting of an alkaline polymer and at least one blend component additionally contains a cross-linking agent, as described in the German patent application DE 10140147 A1.

In order to produce polymer films, the aforementioned polymers may inter alia be extruded. Polymer films can also be obtained by means of casting methods. For example, polyazoles can be dissolved in polar, aprotic solvents, such as dimethylacetamide (DMAc) for example, and a film can be produced by conventional methods.

To remove solvent residues, such as DMAc, the film thus obtained can be cleaned by means of a washing process.

Polymer electrolyte matrices based on alkaline polymers, as described in DE 10117686 A1, DE 10117687 A1 and DE 10144815 A1, DE 10228657 A1, DE 10246373 A1 and DE 10246459 A1, have been shown to be particularly well suited.

Besides the above-described polymer electrolyte matrices made of alkaline polymers and blends made of alkaline polymers and further polymers, other materials can also be used.

Here, in particular polymer electrolyte matrices based on alkaline polymers and polymers based on vinylsulphone/vinylphosphone, as described in DE 10213540 A1, DE 10209419 A1 and DE 10210500 A1, DE 10210499 A1, DE 10235358 A1, DE 10235357 A1 and DE 10235356 A1, are shown.

With the above-mentioned polymer electrolyte matrices based on alkaline polymers and polymers based on vinylsulphone/vinylphosphone, the alkaline polymers mentioned above in connection with polymers based on vinylsulphone/vinylphosphone are produced. Polymers based on vinylsulphone/vinylphosphone are understood to mean polymers, which are obtained using monomers comprising phosphoric acid groups of the formula

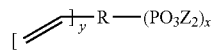

wherein
R represents a bond, a bicovalent C1-C15 alkylene group, a bicovalent C1-C15 alkyleneoxy group, for example ethyleneoxy group, or a bicovalent C5-C20 aryl or heteroaryl group wherein the above-mentioned radicals themselves can be substituted with halogen, —OH, COOZ, —CN, $NZ_2$,
Z represent, independently of another, hydrogen, a C1-C15 alkyl group, a C1-C15 alkoxy group, an ethyleneoxy group or a C5-C20 aryl or heteroaryl group wherein the above-mentioned radicals themselves can be substituted with halogen, —OH, —CN, and
x represents an integer 1, 2, 3, 4, 5, 6, 7, 8, 9 or 10
y represents an integer 1, 2, 3, 4, 5, 6, 7, 8, 9 or 10
and/or of the formula

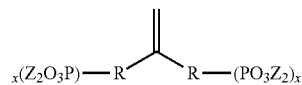

wherein
R represents a bond, a bicovalent C1-C15 alkylene group, a bicovalent C1-C15 alkyleneoxy group, for example ethyleneoxy group, or a bicovalent C5-C20 aryl or heteroaryl group wherein the above-mentioned radicals themselves can be substituted with halogen, —OH, COOZ, —CN, $NZ_2$,
Z represent, independently of another, hydrogen, a C1-C15 alkyl group, a C1-C15 alkoxy group, an ethyleneoxy group or a C5-C20 aryl or heteroaryl group wherein the above-mentioned radicals themselves can be substituted with halogen, —OH, —CN, and
x represents an integer 1, 2, 3, 4, 5, 6, 7, 8, 9 or 10
and/or the formula

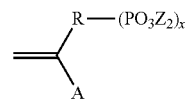

wherein
A represents a group of the formulae $COOR^2$, CN, $CONR^2_2$, $OR^2$ and/or $R^2$,
in which $R^2$ is hydrogen, a C1-C15 alkyl group, a C1-C15 alkoxy group, an ethylenoxy group or a C5-C20 aryl or heteroaryl group, wherein the above radicals may in turn be substituted by halogen, —OH, COOZ, —CN, $NZ_2$, R represents a bond, a bicovalent C1-C15 alkylene group, a bicovalent C1-C15 alkyleneoxy group, for example ethyleneoxy group, or a bicovalent C5-C20 aryl or heteroaryl group wherein the above-mentioned radicals themselves can be substituted with halogen, —OH, COOZ, —CN, $NZ_2$, Z represent, independently of another, hydrogen, a C1-C15 alkyl group, a C1-C15 alkoxy group, an ethyleneoxy group or a C5-C20 aryl or heteroaryl group wherein the above-mentioned radicals themselves can be substituted with halogen, —OH, —ON, and x represents an integer 1, 2, 3, 4, 5, 6, 7, 8, 9 or 10, and/or using monomers comprising sulphonic acid groups of the formula

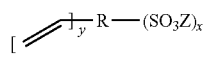

wherein

R represents a bond, a bicovalent C1-C15 alkylene group, a bicovalent C1-C15 alkyleneoxy group, for example ethyleneoxy group, or a bicovalent C5-C20 aryl or heteroaryl group wherein the above-mentioned radicals themselves can be substituted with halogen, —OH, COOZ, —CN, $NZ_2$, Z represent, independently of another, hydrogen, a C1-C15 alkyl group, a C1-C15 alkoxy group, an ethyleneoxy group or a C5-C20 aryl or heteroaryl group wherein the above-mentioned radicals themselves can be substituted with halogen, —OH, —CN, and x represents an integer 1, 2, 3, 4, 5, 6, 7, 8, 9 or 10 y represents an integer 1, 2, 3, 4, 5, 6, 7, 8, 9 or 10 and/or of the formula

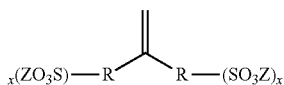

wherein

R represents a bond, a bicovalent C1-C15 alkylene group, a bicovalent C1-C15 alkyleneoxy group, for example ethyleneoxy group, or a bicovalent C5-C20 aryl or heteroaryl group wherein the above-mentioned radicals themselves can be substituted with halogen, —OH, COOZ, —CN, $NZ_2$, Z represent, independently of another, hydrogen, a C1-C15 alkyl group, a C1-C15 alkoxy group, an ethyleneoxy group or a C5-C20 aryl or heteroaryl group wherein the above-mentioned radicals themselves can be substituted with halogen, —OH, —CN, and x represents an integer 1, 2, 3, 4, 5, 6, 7, 8, 9 or 10 and/or of the formula

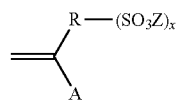

wherein

A represents a group of the formulae $COOR^2$, CN, $CONR^2_2$, $OR^2$ and/or $R^2$, in which $R^2$ is hydrogen, a C1-C15 alkyl group, a C1-C15 alkoxy group, an ethylenoxy group or a C5-C20 aryl or heteroaryl group, wherein the above radicals may in turn be substituted by halogen, —OH, COOZ, —CN, $NZ_2$, R represents a bond, a bicovalent C1-C15 alkylene group, a bicovalent C1-C15 alkyleneoxy group, for example ethyleneoxy group, or a bicovalent C5-C20 aryl or heteroaryl group wherein the above-mentioned radicals themselves can be substituted with halogen, —OH, COOZ, —CN, $NZ_2$, Z represent, independently of another, hydrogen, a C1-C15 alkyl group, a C1-C15 alkoxy group, an ethyleneoxy group or a C5-C20 aryl or heteroaryl group wherein the above-mentioned radicals themselves can be substituted with halogen, —OH, —CN, and x represents an integer 1, 2, 3, 4, 5, 6, 7, 8, 9 or 10, as described in DE 10213540 A1, DE 10209419 A1 and DE 10210500 A1, DE 10210499 A1, DE 10235358 A1, DE 10235357 A1 and DE 10235356 A1, for example.

Preferred monomers comprising phosphonic acid groups include, amongst others, alkenes having phosphonic acid groups, such as ethenephosphonic acid, propenephosphonic acid, butenephosphonic acid; acrylic acid and/or methacrylic acid compounds having phosphonic acid groups, such as for example 2-phosphonomethyl acrylic acid, 2-phosphonomethyl methacrylic acid, 2-phosphonomethyl acrylamide and 2-phosphonomethyl methacrylamide.

Commercially available vinylphosphonic acid (ethenephosphonic acid), such as it is available from the company Aldrich or Clariant GmbH, for example, is particularly preferably used. A preferred vinylphosphonic acid has a purity of more than 70%, in particular 90% and particularly preferably a purity of more than 97%.

The monomers containing phosphonic acid groups may also be used in the form of derivatives which can subsequently be converted into the acid, wherein the conversion to acid may also take place in the polymerised state. These derivatives include in particular the salts, esters, amides and halides of the monomers containing phosphonic acid groups.

Preferred monomers comprising sulphonic acid groups include, amongst others, alkenes having sulphonic acid groups, such as ethenesulphonic acid, propenesulphonic acid, butenesulphonic acid; acrylic acid compounds and/or methacrylic acid compounds having sulphonic acid groups, such as for example 2-sulphonomethyl acrylic acid, 2-sulphonomethyl methacrylic acid, 2-sulphonomethyl acrylamide and 2-sulphonomethyl methacrylamide.

Commercially available vinylsulphonic acid (ethenesulphonic acid), such as it is available from the company Aldrich or Clariant GmbH, for example, is particularly preferably used. A preferred vinylsulphonic acid has a purity of more than 70%, in particular 90% and particularly preferably a purity of more than 97%.

The monomers containing sulphonic acid groups can furthermore be used in the form of derivatives which can subsequently be converted to the acid, wherein the conversion to acid may also take place in the polymerised state. These derivatives include in particular the salts, esters, amides and halides of the monomers comprising sulphonic acid groups.

According to a particular aspect of the present invention, the weight ratio of monomers comprising sulphonic acid groups to monomers comprising phosphonic acid groups can be in the range of 100:1 to 1:100, preferably 10:1 to 1:10 and particularly preferably 2:1 to 1:2.

In another embodiment of the invention, monomers capable of cross-linking can be used in the production of the polymer membrane.

The monomers capable of cross-linking are in particular compounds having at least 2 carbon-carbon double bonds. Preference is given to dienes, trienes, tetraenes, dimethylacrylates, trimethylacrylates, tetramethylacrylates, diacrylates, triacrylates, tetraacrylates.

Particular preference is given to dienes, trienes, tetraenes of the formula

dimethylacrylates, trimethylacrylates, tetramethylacrylates of the formula

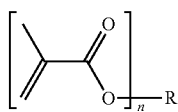

diacrylates, triacrylates, tetraacrylates of the formula

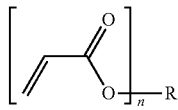

wherein

R represents a C1-C15 alkyl group, a C5-C20 aryl or heteroaryl group, NR', —SO$_2$, PR', Si(R')$_2$, wherein the above-mentioned radicals themselves can be substituted, R' represent, independently of another, hydrogen, a C1-C15 alkyl group, a C1-C15 alkoxy group, a C5-C20 aryl or heteroaryl group, and n is at least 2.

The substituents of the above radical R are preferably halogen, hydroxyl, carboxy, carboxyl, carboxyl ester, nitrile, amine, silyl or siloxane radicals.

Particularly preferred cross-linking agents are allyl methacrylate, ethylene glycol dimethacrylate, diethylene glycol dimethacrylate, triethylene glycol dimethacrylate, tetraethylene glycol dimethacrylate and polyethylene glycol dimethacrylate, 1,3-butanediol dimethacrylate, glycerol dimethacrylate, diurethane dimethacrylate, trimethylpropane trimethacrylate, epoxy acrylates, for example ebacryl, N',N-methylenebisacrylamide, carbinol, butadiene, isoprene, chloroprene, divinylbenzene and/or bisphenol A dimethylacrylate. These compounds are commercially available from Sartomer Company Exton, Pa. under the designations CN-120, CN104 and CN-980, for example.

The use of cross-linking agents is optional, wherein these compounds can typically be employed in the range of 0.05 and 30% by weight, preferably 0.1 to 20% by weight, particularly preferably 1 to 10% by weight, based on the weight of the monomers comprising phosphonic acid groups.

A fundamental aspect and technical advantage of the membrane electrode assembly according to the invention is that the excellent capability is obtained with a low concentration of catalytically active substances, such as for example platinum, ruthenium or palladium, heretofore not achieved.

To further improve the properties in terms of application technology, the flat material can feature fillers, in particular proton-conducting fillers.

Non-limiting examples of proton-conducting fillers are
sulphates, such as $CsHSO_4$, $Fe(SO_4)_2$, $(NH_4)_3H(SO_4)_2$, $LiHSO_4$, $NaHSO_4$, $KHSO_4$, $RbSO_4$, $LiN_2H_5SO_4$, $NH_4HSO_4$,
phosphates, such as $Zr_3(PO_4)_4$, $Zr(HPO_4)_2$, $HZr_2(PO_4)_3$, $UO_2PO_4 \cdot 3H_2O$, $H_8UO_2PO_4$, $Ce(HPO_4)_2$, $Ti(HPO_4)_2$, $KH_2PO_4$, $NaH_2PO_4$, $LiH_2PO_4$, $NH_4H_2PO_4$, $CsH_2PO_4$, $CaHPO_4$, $MgHPO_4$, $HSbP_2O_8$, $HSb_3P_2O_{14}$, $H_5Sb_5P_2O_{20}$,
polyacid, such as $H_3PW_{12}O_{40} \cdot nH_2O$ (n=21-29), $H_3SiW_{12}O_{40} \cdot nH_2O$ (n=21-29), $H_xWO_3$, $HSbWO_6$, $H_3PMo_{12}O_{40}$, $H_2Sb_4O_{11}$, $HTaWO_6$, $HNbO_3$, $HTiNbO_5$, $HTiTaO_5$, $HSbTeO_6$, $H_5Ti_4O_9$, $HSbO_3$, $H_2MoO_4$
selenides and arsenides such as $(NH_4)_3H(SeO_4)_2$, $UO_2AsO_4$, $(NH_4)_3H(SeO_4)_2$, $KH_2AsO_4$, $Cs_3H(SeO_4)_2$, $Rb_3H(SeO_4)_2$,
phosphides, such as ZrP, TiP, HfP
oxides, such as $Al_2O_3$, $Sb_2O_5$, $ThO_2$, $SnO_2$, $ZrO_2$, $MoO_3$
silicates, such as zeolites, zeolites($NH_4$+), phyllosilicates, tectosilicates, H-natrolites, H-mordenites, $NH_4$-analcines, $NH_4$-sodalites, $NH_4$-gallates, H-montmorillonites
acids, such as $HClO_4$, $SbF_5$
fillers, such as carbides, in particular SiC, $Si_3N_4$, fibres, in particular glass fibres, glass powders and/or polymer fibres, preferably based on polyazoles.

These additives can be included in the proton-conducting polymer membrane in usual amounts, however, the positive properties of the membrane, such as great conductivity, long service life and high mechanical stability, should not be affected too much by the addition of too large amounts of additives. Generally, the membrane comprises not more than 80% by weight, preferably not more than 50% by weight and particularly preferably not more than 20% by weight, of additives.

The membrane electrode assemblies conditioned according to the invention contain at least one oxo acid of phosphorus and/or sulphur in the polymer electrolyte matrix. The acids identified above are strong acids, in particular mineral acids, particularly preferably phosphoric acid and/or sulphuric acid as well as their derivatives.

Within the scope of the present description, "phosphoric acid" means polyphosphoric acid ($H_{n+2}P_nO_{3n+1}$ (n>1), which usually has a content of at least 83%, calculated as $P_2O_5$ (by acidimetry), phosphonic acid ($H_3PO_3$), orthophosphoric acid ($H_3PO_4$), pyrophosphoric acid ($H_4P_2O_7$), triphosphoric acid ($H_5P_3O_{10}$) and metaphosphoric acid. The phosphoric acid, in particular orthophosphoric acid, preferably has a concentration of at least 80 percent by weight. Furthermore, the term phosphoric acid comprises also such compounds that release corresponding phosphoric acids during use in the fuel cell or form these by means of build-up or degradation. This is in particular to be understood to mean organic phosphoric acids and their derivatives, respectively.

The polymer electrolyte matrix used according to the invention is proton-conducting. Furthermore, the polymer electrolyte matrix has at least 6 mole of acid per polymer repeating unit, preferably at least 8 mole, particularly preferably at least 14 mole.

The thickness of the polymer electrolyte matrix in the membrane electrode assembly is preferably between 5 and 4000 µm, preferably between 10 and 3500 µm, in particular between 20 and 3000 µm, particularly preferably between 30 and 1500 µm and very particularly preferably between 50 and 1200 µm.

The polymer electrolyte matrix shows high proton conductivity. This is at least 0.1 S/cm, preferably at least 0.11 S/cm, in particular at least 0.12 S/cm at temperatures of 120° C.

The specific conductivity is measured by means of impedancy spectroscopy in a O-pole arrangement in potentiostatic mode and using platinum electrodes (wire, diameter of 0.25 mm), as described in DE 10117687 A1.

A membrane electrode assembly according to the invention comprises, in addition to the polymer membrane, at least two electrodes which are each in contact with the membrane.

Generally, the electrode comprises a gas diffusion layer. The gas diffusion layer in general exhibits electron conductivity. Flat, electrically conductive and acid-resistant structures are commonly used for this. These include, for example, carbon-fibre paper, graphitised carbon-fibre paper, carbon-fibre fabric, graphitised carbon-fibre fabric and/or flat structures which were rendered conductive by addition of carbon black.

Furthermore, the electrode includes at least one catalyst layer. This layer contains at least one precious metal of the platinum group, in particular Pt, Pd, Ir, Rh, Os, Ru, and/or at least one precious metal Au and/or Ag, or the catalyst layer is formed from i. at least one precious metal of the platinum group, in particular Pt, Pd, Ir, Rh, Os, Ru, and/or at least one precious metal Au and/or Ag ii. and at least one metal less precious according to the electrochemical series as the metal mentioned in (i.), in particular selected from the group of Fe, Co, Ni, Cr, Mn, Zr, Ti, Ga, V.

Preferably, the catalyst is formed in the form of an alloy of the metals (i) and (ii). In addition to the alloy, further catalytically active substances, in particular precious metals of the platinum group, i.e. Pt, Pd, Ir, Rh, Os, Ru, or also the precious metals Au and Ag, can be used. Furthermore, the oxides of the above-mentioned precious metals and/or non-precious metals can also be used.

The catalytically active particles comprising the above-mentioned substances may be used as metal powder, so-called black precious metal, in particular platinum and/or platinum alloys. Such particles generally have a size in the range of 5 nm to 200 nm, preferably in the range of 7 nm to 100 nm.

Furthermore, the metals can also be used on a support material. Preferably, this support comprises carbon which particularly can be used in the form of carbon black, graphite or graphitised carbon black. Furthermore, electrically conductive metal oxides, such as for example, $SnO_x$, $TiO_x$, or phosphates, such as e.g. $FePO_x$, $NbPO_x$, $Zr_y(PO_x)_z$, can be used as support material. In this connection, the indices x, y and z designate the oxygen or metal content of the individual compounds which can lie within a known range as the transition metals can be in different oxidation stages.

The content of these metal particles on a support, based on the total weight of the bond of metal and support, is generally in the range of 1 to 80% by weight. The particle size of the support, in particular the size of the carbon particles, is preferably in the range of 20 to 100 nm. The size of the metal particles present thereon is preferably in the range of 1 to 20 nm.

The catalyst layer has a thickness in the range of 0.1 to 50 μm.

The membrane electrode assembly according to the invention has a catalyst loading of 0.1 and 10 g/m², based on the surface of the polymer electrolyte matrix.

The weight ratio of the precious metals of the platinum group or of Au and/or Ag to the metals less precious according to the electrochemical series is between 1:100 and 100:1.

The catalyst can, amongst other things, be applied to the gas diffusion layer. Subsequently, the gas diffusion layer provided with a catalyst layer can be bonded with a polymer membrane to obtain a membrane electrode assembly according to the invention.

In this connection, the membrane can be provided with a catalyst layer on one side or both sides. If the membrane is provided with a catalyst layer only on one side, the opposite side of the membrane has to be pressed together with an electrode which comprises a catalyst layer. If both sides of the membrane are to be provided with a catalyst layer, the following methods can also be applied in combination to achieve an optimal result.

In the membrane electrode assembly according to the invention, the catalysts contained in the electrode or the catalyst layer adjacent to the gas diffusion layer at the side of the cathode and anode differ.

The catalyst can be applied to the membrane using customary methods, such as spraying methods and printing processes, such as for example screen and silk screen printing processes, inkjet printing processes, application with rollers, in particular anilox rollers, application with a slit nozzle and application with a doctor blade.

A membrane electrode assembly according to the invention exhibits a surprisingly high power density. According to a particular embodiment, preferred membrane electrode assemblies accomplish a current density of at least 0.3 A/cm², preferably 0.4 A/cm², particularly preferably 0.5 A/cm². This current density is measured in operation with pure hydrogen at the anode and air (approx. 20% by volume of oxygen, approx. 80% by volume of nitrogen) at the cathode, with standard pressure (1013 mbar absolute, with an open cell outlet) and a cell voltage of 0.6 V. In this connection, particularly high temperatures in the range of 150-200° C., preferably 160-180° C., in particular 170° C. can be applied.

The power densities mentioned above can also be achieved with a low stoichiometry of the fuel gases on both sides. According to a particular aspect of the present invention, the stoichiometry is less than or equal to 2, preferably less than or equal to 1.5, very particularly preferably less than or equal to 1.2.

According to a particular embodiment of the present invention, the catalyst layer has a low content of precious metals. The content of precious metals of a preferred catalyst layer which is comprised by a membrane according to the invention is preferably not more than 2 mg/cm², in particular not more than 1 mg/cm², very particularly preferably not more than 0.5 mg/cm². According to a particular aspect of the present invention, one side of a membrane exhibits a higher metal content than the opposite side of the membrane. Preference is given to the metal content of the one side being at least twice as high as the metal content of the opposite side.

For further information on membrane electrode assemblies, reference is made to the technical literature, in particular the U.S. Pat. No. 4,191,618, U.S. Pat. No. 4,212,714 and U.S. Pat. No. 4,333,805. The disclosure contained in the above-mentioned citations [U.S. Pat. No. 4,191,618, U.S. Pat. No. 4,212,714 and U.S. Pat. No. 4,333,805] with respect to the structure and production of membrane electrode assemblies as well as the electrodes, gas diffusion layers and catalysts to be chosen is also part of the description.

EXAMPLES

Example 1

The PBI membrane was produced as described in DE 10117687 A1. Four membrane pieces with a size of 10 cm² were cut from the membrane. In this connection, a standard electrode from ETEK with a Pt loading of 1 mg/cm² was used as the anode and cathode. The membrane electrode assemblies were pressed with 1 N/mm² at 140° C. for 30 seconds.

The reference sample was installed in the cell in an untreated state.

Sample 2 was conditioned in an oven for 0.5 h at 250° C. under air atmosphere.

Sample 3 was conditioned in an oven for 1 h at 250° C. under air atmosphere.

Sample 4 was conditioned in an oven for 2 h at 250° C. under air atmosphere.

The membrane electrode assemblies were driven in at 0.3 A/cm². E-1 curves were recorded at 0 and 2 atm after one day. Table 1 compares the open circuit voltage (OCV) and the voltages at 0.3 and 0.6 A/cm², respectively.

TABLE 1

|  | OCV @ 0 bar | mV @ 0.3 A/cm² | OCV @ 2 bar | mV @ 0.6 A/cm² |
| --- | --- | --- | --- | --- |
| Reference | 871 | 520 | 927 | 624 |
| Sample 1 | 935 | 592 | 961 | 669 |
| Sample 2 | 907 | 575 | 956 | 652 |
| Sample 3 | 989 | 591 | 1014 | 669 |

Example 2

The PBI membrane was produced as described in DE 10117687 A1 and a membrane electrode assembly (MEA) was prepared—as described in example 1.

The MEAs are subsequently placed in an oven at a temperature of 160° C. and removed from the oven after different treatment times. The MEAs are then titrated to determine the acid concentration. In doing so, a sample is punched out of an MEA with a punching iron with a diameter of 2.5 cm and the electrodes are subsequently delaminated from the membrane. The delaminated polymer matrix is extracted in 50 ml of distilled water and 30 ml of acetone at 80° C. for 30 minutes. After cooling to room temperature, the solution and the sample are jointly titrated with 0.1 M NaOH.

The results of an experiment are shown in table 2. In this experiment, two samples each were taken from two MEAs each and the concentration of the phosphoric acid was determined. Therewith, it shows that the phosphoric acid concentration can be set via the tempering time and temperature.

|  | Temperature [° C.] | Time [min] | Phosphoric Acid Concentration in MEA [%]wt | Water Concentration in MEA [%]wt |
| --- | --- | --- | --- | --- |
| Untreated | — | 0 | 74 ± 2 | 26 |
| Treated | 160° C. | 2 | 83 ± 5 | 17 |
| Treated | 160° C. | 10 | 89 ± 2 | 11 |
| Treated | 160° C. | 30 | 89 ± 1 | 11 |
| Treated | 160° C. | 900 | 89 ± 2 | 11 |
| Treated | 140° C. | 10 | 84 ± 3 | 16 |

Example 3

In this experiment, the electrochemical output of conditioned MEAs is examined. The measurements take place in individual cells of 50 cm². Hydrogen with a stoichiometry of 1.2 is used on the anode side, air with a stoichiometry of 2 is used on the cathode side. The measurements take place in ambient pressure. Current voltage characteristics of the individual cells are recorded after an operating time of 100 h. Three individual cells were examined, which were equipped with an untreated MEA, an MEA tempered for 30 min at 120° C. and an MEA tempered for 30 min at 160° C., respectively.

FIG. 1 shows the current voltage characteristics. It becomes clear that different tempering conditions influence the MEA outputs in a positive way. Thus, the measured cell voltage at 0.5 A/cm² after a tempering step at 160° C. and 30 min is higher by 12 mV than in an untreated MEA. After a tempering step at 120° C. and 20 min, the cell voltage at 0.5 A/cm² is by 5 mV higher in comparison with an untreated MEA.

The invention claimed is:

1. A method for conditioning a membrane electrode assembly wherein the membrane electrode assembly comprises
   A) at least one polymer electrolyte matrix in the form of a membrane containing at least one oxo acid of phosphorus and/or sulphur and at least one polymer with at least one heteroatom selected from the group of nitrogen, oxygen and/or sulphur and wherein said at least one polymer electrolyte matrix in the form of a membrane has a proton conductivity of at least 0.1 S/cm @ temperatures of 120° C.; and
   B) at least two electrodes;
   which comprises laminating the polymer matrix and the electrodes to form a membrane electrode assembly and conditioning in a temperature range of 100° C. to 300° C. after the lamination and wherein the conditioning is performed under substantially currentless conditions.

2. The method of claim 1, wherein the conditioning is performed at a temperature of from 100° C. to 290° C. and the minimum duration of the conditioning is at least 1 minute.

3. The method of claim 1, wherein the conditioning is performed at a temperature of from 140° C. to 275° C. and the minimum duration of the conditioning is at least 2 minutes.

4. The method of claim 1, wherein the minimum duration of the conditioning is at least 30 seconds.

5. The method of claim 1, wherein the conditioning of the membrane electrode assembly is performed in an individual fuel cell or in a fuel cell stack.

6. The method of claim 5, wherein flushing with at least one gaseous medium takes place at least during the conditioning.

7. The method of claim 6, wherein the gaseous medium is air, oxygen, nitrogen and/or noble gases.

8. The method of claim 6, wherein the media used as the gaseous medium contains no hydrogen gas or develops no hydrogen gas under the chosen conditions.

9. The method of claim 1, wherein the polymer electrolyte matrix is an alkaline polymer and in turn contains at least one polymer with at least one heteroatom selected from the group of nitrogen, oxygen and/or sulphur.

10. The method of claim 9, wherein the alkaline polymer is a polymer comprising at least one nitrogen atom.

11. The method of claim 9, wherein the alkaline polymer is a polyphosphazene, polyimine, polyisocyanide, polyetherimine, polyaniline, polyamide, polyhydrazide, polyurethane, polyimide, polyazole or polyazine, or a mixture thereof.

12. The method of claim 9, wherein the alkaline polymer is a polymer based on polyazole, which contains the recurring azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII)

and/or (XIV) and/or (XV) and/or (XVI) and/or (XVII) and/or (XVIII) and/or (XIX) and/or (XX) and/or (XXI) and/or (XXII)
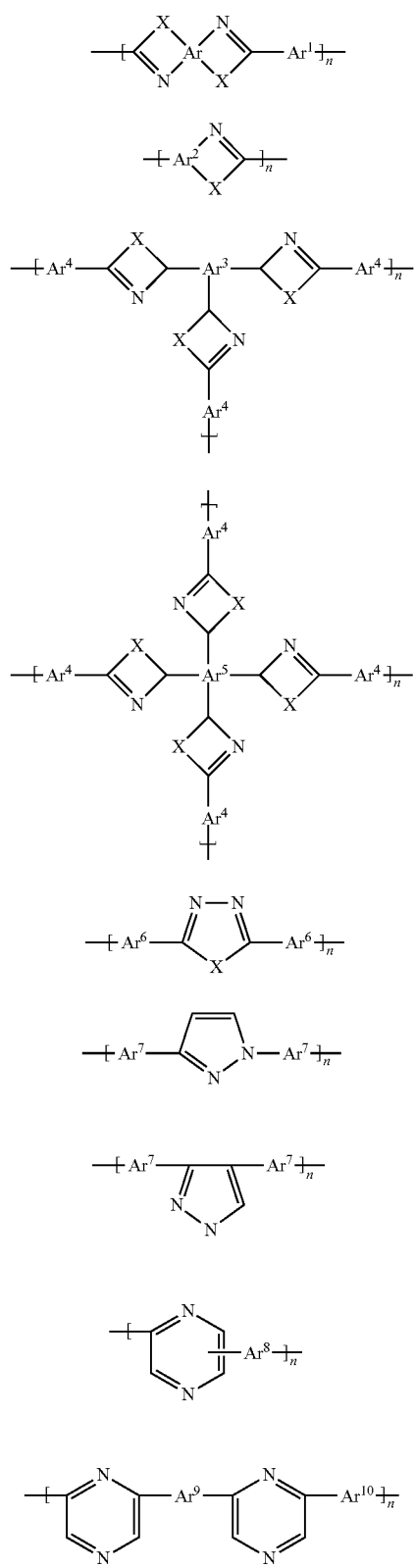
(I)
(II)
(III)
(IV)
(V)
(VI)
(VII)
(VIII)
(IX)
-continued
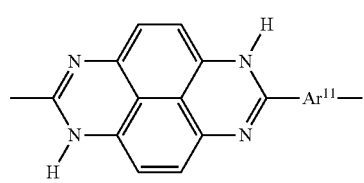 (X)
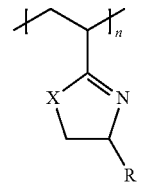 (XI)
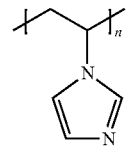 (XII)
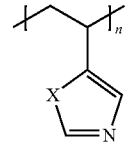 (XIII)
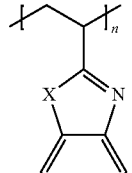 (XIV)
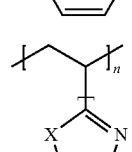 (XV)
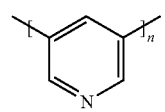 (XVI)
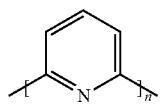 (XVII)
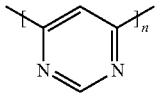 (XVIII)
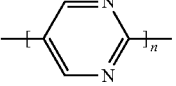 (XIX)

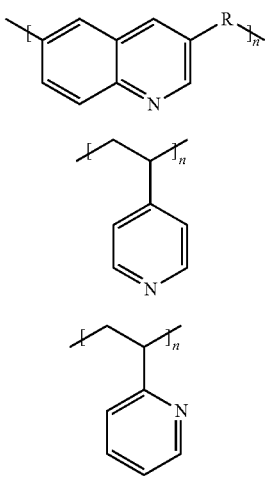

wherein
Ar are the same or different and are each a tetravalent aromatic or heteroaromatic group which may be mononuclear or polynuclear, $Ar^1$ are the same or different and are each a divalent aromatic or heteroaromatic group which may be mononuclear or polynuclear, $Ar^2$ are the same or different and are each a divalent or trivalent aromatic or heteroaromatic group which may be mononuclear or polynuclear, $Ar^3$ are the same or different and are each a trivalent aromatic or heteroaromatic group which may be mononuclear or polynuclear, $Ar^4$ are the same or different and are each a trivalent aromatic or heteroaromatic group which may be mononuclear or polynuclear, $Ar^5$ are the same or different and are each a tetravalent aromatic or heteroaromatic group which may be mononuclear or polynuclear, $Ar^6$ are the same or different and are each a divalent aromatic or heteroaromatic group which may be mononuclear or polynuclear, $Ar^7$ are the same or different and are each a divalent aromatic or heteroaromatic group which may be mononuclear or polynuclear, $Ar^8$ are the same or different and are each a trivalent aromatic or heteroaromatic group which may be mononuclear or polynuclear, $Ar^9$ are the same or different and are each a divalent or trivalent or tetravalent aromatic or heteroaromatic group which may be mononuclear or polynuclear, $Ar^{10}$ are the same or different and are each a divalent or trivalent aromatic or heteroaromatic group which may be mononuclear or polynuclear, $Ar^{11}$ are the same or different and are each a divalent aromatic or heteroaromatic group which may be mononuclear or polynuclear, X are the same or different and are each oxygen, sulphur or an amino group which bears a hydrogen atom, a group having 1-20 carbon atoms, preferably a branched or unbranched alkyl or alkoxy group, or an aryl group as further radical, R are identical or different and represent hydrogen, an alkyl group and an aromatic group, with the proviso that R in the formula (XX) is not hydrogen, and n and m are identical or different and are each an integer greater than or equal to 10.

13. The method of claim 12, wherein n and m are identical or different and are each an integer or equal to 100.

14. The method of claim 13, wherein the polymer is a copolymer or a blend which contains at least two units of the formulae (I) to (XXII) which differ from one another.

15. The method of claim 14, wherein the polymer is in the form of block copolymers, random copolymers, periodic copolymers and/or alternating polymers.

16. The method of claim 1, wherein the polymer electrolyte matrix further comprises a further polymer.

17. The method of claim 16, wherein said further polymer is at least one of the following polymers selected from the group consisting of
A. polysulphone,
B. polyethersulphone,
C. polyaryl ketone,
D. polyether ketone,
E. polyether ketone ketone,
F. polyether ether ketone,
G. polyether ether ketone ketone and
H. an aromatic polymer carrying sulphonic acid groups.

18. The method of claim 1, wherein the membrane electrode assembly to be conditioned is contained in a fuel cell system or a fuel cell stack.

19. The method of claim 1, wherein said at least one polymer electrolyte matrix in the form of a membrane has a proton conductivity of at least 0.12 S/cm @ temperatures of 120° C.

* * * * *